Mar. 3, 1925.
H. BOZZALLA
COFFEE MAKING APPARATUS
Filed Jan. 13, 1923    3 Sheets-Sheet 1
1,528,601
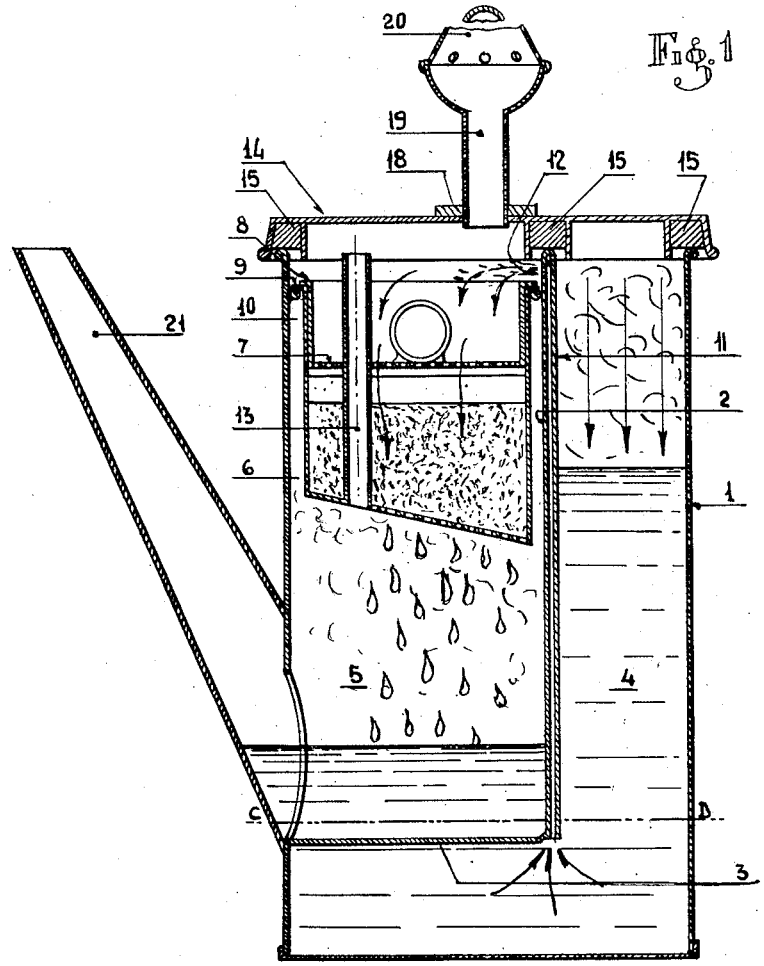
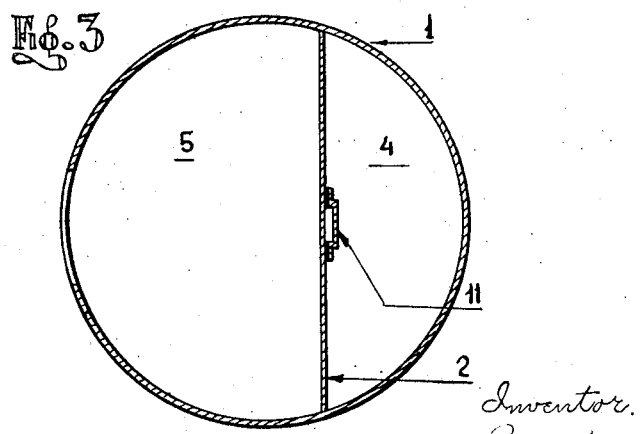

Mar. 3, 1925. 1,528,601
H. BOZZALLA
COFFEE MAKING APPARATUS
Filed Jan. 13, 1923 3 Sheets-Sheet 2
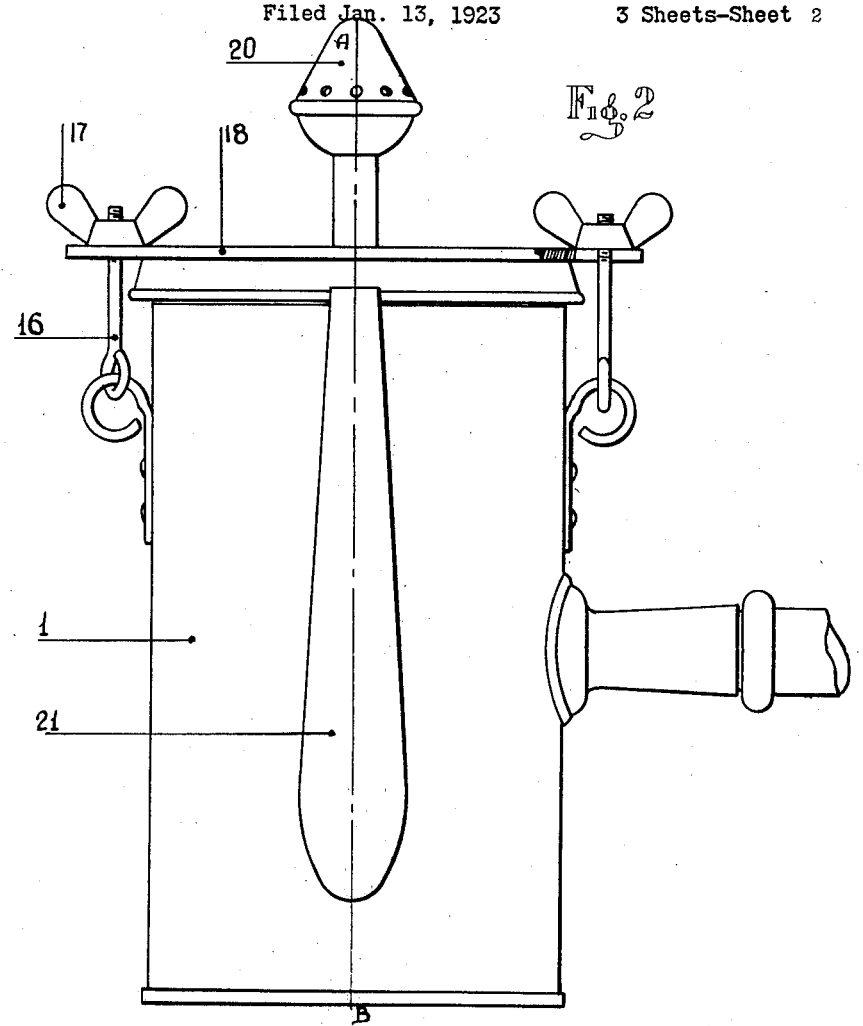
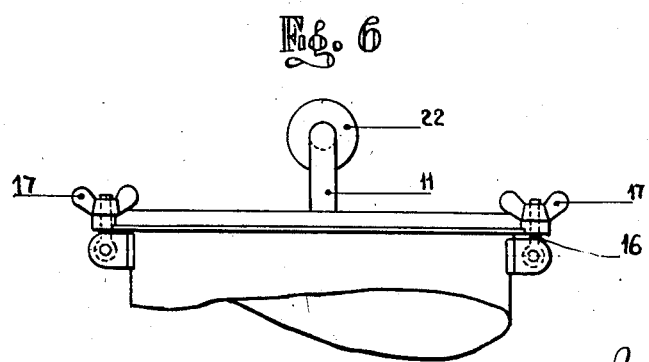
Inventor.
Hermenegildo Bozzalla,
By ———— Atty.

Mar. 3, 1925.
H. BOZZALLA
1,528,601
COFFEE MAKING APPARATUS
Filed Jan. 13, 1923
3 Sheets-Sheet 3
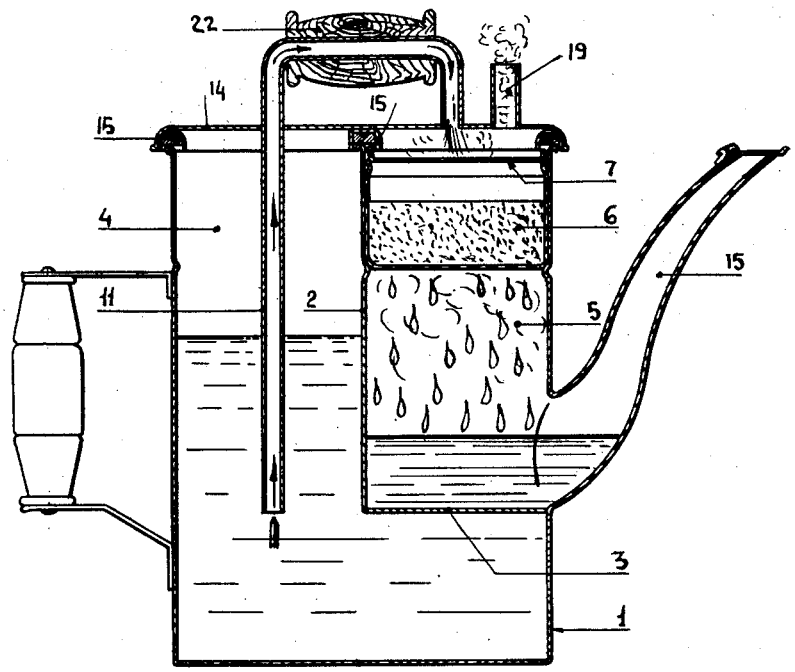
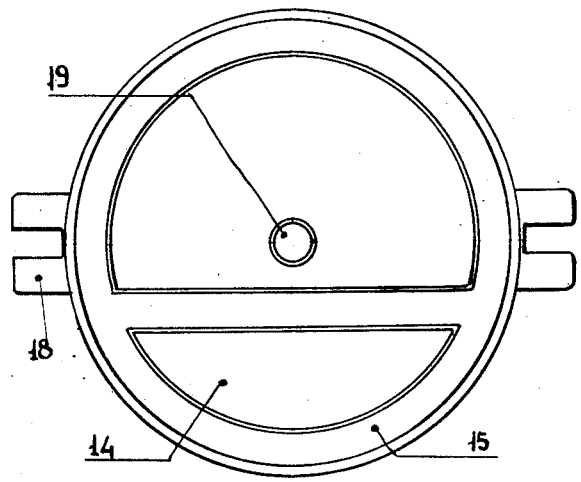
Inventor.
Hermenegildo Bozzalla
By
Atty.

Patented Mar. 3, 1925.

1,528,601

UNITED STATES PATENT OFFICE.

HERMENEGILDO BOZZALLA, OF TURIN, ITALY.

COFFEE-MAKING APPARATUS.

Application filed January 13, 1923. Serial No. 612,506.

*To all whom it may concern:*

Be it known that I, HERMENEGILDO BOZZALLA, manufacturer, a subject of the King of Italy, and resident of 3, Via Rosolino Pilo, Turin, in the Kingdom of Italy, have invented certain new and useful Improvements in Coffee-Making Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for preparing coffee and like infusions, more particularly suitable for restaurants and bars, consisting of a small number of pieces and therefore very simple and economical in construction and at the same time effective in operation.

The coffee-making apparatus forming the object of my invention consists of a shell or casing of a preferably cylindrical form divided through a vertical partition and a horizontal diaphragm into two half-cylindrical chambers, or receptacles, of which the larger one contains water and the smaller one collects the coffee infusion.

The two receptacles are closed by a single cover provided with suitable packings or fittings and they communicate with each other by means of a siphon tube, the water being caused to ascend through this tube by the pressure arising in the water receptacle when boiling starts. The water is discharged upon the ground coffee contained in a holder with a double filter, and the infusion is then collected in the coffee receptacle.

The accompanying drawings show two constructional forms of the apparatus forming the object of this invention.

Fig. 1 is a section thereof on line A—B of Figure 2.

Fig. 2 is a front elevation.

Fig. 3 is a section on line C—D of Figure 1.

Figure 4, is a plan view from underneath of the coffee making apparatus shown in Figs. 1 and 2.

Fig. 5 is a section referring to the second constructional form.

Fig. 6 is a detail of the fastening means for the cover of the coffee making apparatus shown in Fig. 5.

1 denotes a cylindrical shell or casing, divided into two chambers or receptacles 4, 5 by a vertical partition 2 and a horizontal diaphragm 3.

In the upper end of the chamber 5 is situated a holder with a perforated and inclined bottom 6 for the powdered coffee. The holder has fitted in it an upper perforated spreader 7, and both pieces are provided with flanges 8, 9 resting upon a rib formed by a wire 10 welded to the wall of the chamber 5.

To the vertical partition 2 is welded a metallic band bent in a U-form, serving as siphon, 11. This tube 11 communicates at its lower end with the water within the chamber 4 and is connected at its upper end with the chamber 5 through a small hole 12. The portion of the chamber 5 below the holder 6 communicates with the upper compartment through a tube 13 passing through the perforated bottom (to which it is welded) and through the spreader.

The two chambers 4, 5 are closed by a cover 14, provided with packings 15 (conveniently of rubber) and fastened by means of the screws 16 and wing nuts 17 acting upon the bridge piece 18. A vent pipe 19 ending with a hollow ball 20 is fitted in the cover, and the ball is perforated and communicates with the chamber 5.

The operation of the apparatus is substantially as follows:

The holder 6 is filled with ground coffee and water is poured into the chamber 4, the cover is then fitted and fastened and the apparatus is heated.

When the water starts boiling, the steam pressure causes it to rise through the siphon 11 and hole 12 whence it is discharged upon and into the powdered coffee in the holder 6.

The infusion thus obtained falls into the receptacle 5.

When the water level in the chamber 4 sinks below the siphon 11, steam instead of water rises through the tube into the chamber 5, whence it flows into the perforated ball 20, this denoting that the operation is at an end and coffee can be drawn from 5 through the spout 21.

It is obvious that a certain amount of water permanently remains on the bottom of the chamber 4, and prevents the said bottom from being damaged by the heating means.

In the constructional form shown in Figures 5 and 6, the only difference to the constructional form described above is that the siphon 11 instead of being welded to the wall 2 is fast with the cover 14 and passes through same before opening into the upper part of the receptacle 5.

The upper and outer part of the tube 11 is enclosed in a sleeve 22.

The cover 14 is fixed water-tight by means of screws 16 (Fig. 6) and wing nuts 17, similarly to the cover of the first constructional form.

What I claim as my invention is:

1. A coffee making apparatus comprising a casing, means therein dividing the casing into a water receptacle and a coffee receptacle, a cover for the casing, sealing means between the cover and casing, means on the cover co-operating with the dividing means to prevent communication between the top of one receptacle and the top of the other receptacle and means for establishing communication between the top of the coffee receptacle and the outside.

2. A coffee making apparatus comprising a casing, a partition therein forming separate receptacles, a cover for the casing, a packing between the cover and partition to prevent communication between the top of one receptacle and the top of the other receptacle, and means in the cover for venting the coffee receptacle to the atmosphere.

3. A coffee making apparatus comprising a casing, a partition and a diaphragm therein forming separate receptacles, a cover for the casing, a packing on the cover engaging the partition and forming a closure between the receptacles at the tops thereof, and means in the cover for venting the coffee receptacle to the atmosphere.

4. A coffee making apparatus comprising a casing, partitions forming water and coffee receptacles in the casing, a container in the coffee receptacle, a conduit passing through the container to establish communication between the upper and lower parts of the coffee receptacle and means for venting the latter through the top of the casing.

5. A coffee making apparatus comprising a casing, partitions forming water and coffee receptacles in the casing, a container in the coffee receptacle, a conduit passing through the container, a cover for the casing, a packing on the cover co-operating with one of the partitions to close the top of the water receptacle, and means for venting the coffee receptacle to the atmosphere.

6. A coffee making apparatus comprising a casing, partitions forming water and coffee receptacles therein, a coffee container in the coffee receptacle, a tube passing through the container establishing communication between the upper and lower parts of the coffee receptacle, a cover on the casing, a packing on the cover forming a closure between the receptacles at the tops thereof, and a vent in the cover communicating with the coffee receptacle.

7. A coffee making apparatus comprising a casing, partitions forming water and coffee receptacles therein, a coffee container in the coffee receptacle, a tube passing through the container establishing communication between the upper and lower parts of the coffee receptacles, a cover on the casing, a packing on the cover forming a closure between the receptacles, a conduit establishing communication between the lower part of the water receptacle and the upper part of the coffee receptacle, and a vent in the cover communicating with the coffee receptacle at the top thereof.

In testimony that I claim the foregoing as my invention I have signed my name.

HERMENEGILDO BOZZALLA.